United States Patent [19]
Clarey et al.

[11] Patent Number: 6,084,758
[45] Date of Patent: Jul. 4, 2000

[54] POWER DISTRIBUTION SYSTEM WITH CIRCUIT BREAKERS REMOTELY RESETTABLE BY SIGNALS TRANSMITTED OVER THE POWER LINES

[75] Inventors: Robert J. Clarey, Mt. Lebanon; Joseph Charles Engel, Monroeville, both of Pa.

[73] Assignee: Eaton Corporation, Cleveland, Ohio

[21] Appl. No.: 09/179,142

[22] Filed: Oct. 26, 1998

[51] Int. Cl.[7] .................................................... H02H 3/00
[52] U.S. Cl. ................................................. 361/62; 361/42
[58] Field of Search ............................ 361/42–50, 62–69

[56] References Cited

U.S. PATENT DOCUMENTS

| | | | |
|---|---|---|---|
| 5,373,411 | 12/1994 | Grass et al. | 361/64 |
| 5,459,630 | 10/1995 | MacKenzie et al. | 361/45 |
| 5,633,776 | 5/1997 | Juncu et al. | 361/115 |
| 5,684,710 | 11/1997 | Ehlers et al. | 364/528.28 |
| 5,691,869 | 11/1997 | Engel et al. | 361/42 |

*Primary Examiner*—Ronald W. Leja
*Attorney, Agent, or Firm*—Martin J. Moran

[57] ABSTRACT

Circuit breakers in an electric power distribution system, such as in a residence or a light commercial facility, are remotely reclosed using a power line communications system such as an X10 or CEBus system, which transmits a reclose signal over the power conductors to a recloser controlling the separable contacts of the circuit breaker in the load center. A remote master unit which generates the reclose signal is connected to an unaffected branch circuit, preferably by plugging into a receptacle located in a convenient part of the house or office remote from the load center. The reclosers may be addressed individually or globally.

13 Claims, 1 Drawing Sheet

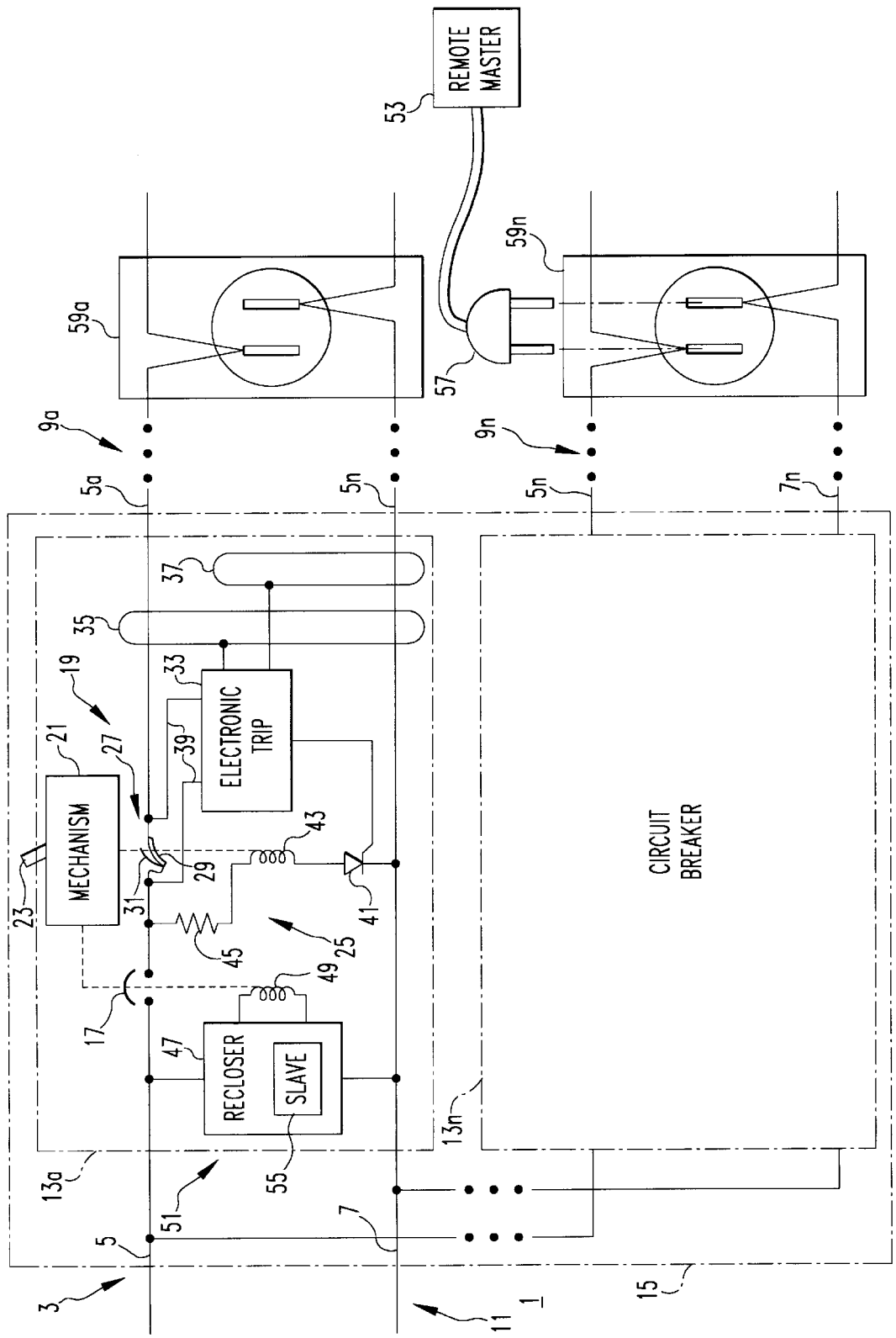

POWER DISTRIBUTION SYSTEM WITH CIRCUIT BREAKERS REMOTELY RESETTABLE BY SIGNALS TRANSMITTED OVER THE POWER LINES

BACKGROUND OF THE INVENTION

1. Field of the Invention

This invention relates to electric power distribution systems such as those found in residential or light commercial applications in which circuit breakers can be reclosed from a remote location using power line communications.

2. Background Information

Circuit breakers are commonly used to provide both main and branch circuit protection in homes and light commercial applications. The breakers are mounted in enclosures called load centers which are normally placed in non-intrusive locations such as basements, garages, and the like, as they usually do not require maintenance or attention. A circuit breaker is an automatic device which will trip or open immediately should an overcurrent (short circuit or overload) occur in the protected circuit. Such a condition should be, and in fact must be, corrected before the circuit breaker can be reset to reestablish the circuit. These circuit breakers also respond to overload conditions which can occur for instance when too many loads, such as several appliances, are energized by the same branch circuit. Such overloads can dangerously overheat the branch circuit wiring if permitted to continue on, but the circuit breaker responds to persistent overloads by tripping open. The overload condition can be corrected by reducing the load on the protected circuit and it is then safe to reclose the circuit breaker.

There is a growing interest in providing protection against arcing faults which can occur due to abused or damaged cables/wires/cords. For instance, when an extension cord is cut or becomes worn and in other circumstances where bared conductors of opposite polarity come into temporary or permanent contact or breaks occur in wiring. Electronic circuits respond to such faults and trip the circuit breaker. Again, the circuit breaker can be reset after the faulty cord is disconnected or the arcing condition is otherwise terminated. Electronic trip circuits are also available for tripping the circuit breaker open in response to ground faults. Once this condition is cleared it is also safe to reclose the circuit breaker.

Currently it is necessary to go to the load center to reset a tripped circuit breaker. As mentioned, the load center can be in the basement or in some other isolated location within the house or building. It is sometimes difficult to identify the tripped circuit breaker from among the numerous circuit breakers housed side by side in the load center. In addition, the lighting at the load center could be on the tripped circuit thereby making it more difficult to locate the correct circuit breaker.

U.S. Pat. No. 5,373,411 discloses a residential circuit breaker which incorporates a solenoid operated switch in series with the circuit breaker contacts. The switch allows the branch circuit to be energized and deenergized at the load center from a remote location. However, the switch can only be used to open and close on normal currents below the rated current of the circuit breaker. The circuit breaker stills responds to short circuits and overloads to interrupt current flow by tripping open. The tripped circuit breaker is not remotely resettable. It still requires manual operation at the load center. Furthermore, additional wiring is required between the solenoid of the switch and the remote location.

There is a need, therefore, for an improved electric power distribution system such as for residences and light commercial applications in which tripped circuit breakers can be reset remotely.

There is a particular need for such a system which can be adapted to present power distribution systems easily and economically.

In particular there is a need for such an improved power system which requires no additional wiring.

SUMMARY OF THE INVENTION

These needs and others are satisfied by the invention which is directed to an electric power distribution system which includes a network of conductors forming a plurality of branch circuits connected to a main circuit and recloseable circuit breakers connected in at least some of the branch circuits adjacent the main circuit such as in the load center. The recloseable circuit breakers include separable contacts and operating means which include trip means which trip the separable contacts open in response to predetermined current conditions in the branch circuit and reclose means to reclose the separable contacts in response to a reclose signal. The reclose means is connected upstream of the separable contacts of the circuit breaker so that it can be energized when the circuit breaker is tripped. This also enables it to respond to a remotely generated reclose signal which is transmitted over the power conductors.

As the branch circuit protected by a tripped circuit breaker becomes deenergized, the remote means for generating the reset signal must be connected in a branch circuit in which the circuit breaker is not tripped in order for the reset signal to be transmitted to the reclose means of the tripped circuit breaker. Preferably, this remote reset signal generator can be selectively connected to any of the branch circuits. This is most easily accommodated by plugging the remote signal generator into a receptacle in another branch circuit. Each of the recloseable circuit breakers can have an assigned address so that a reclose signal may be directed only to a specific circuit breaker. Preferably, the circuit breakers also respond to a global address so that all tripped circuit breakers may be reset or a circuit breaker may be reset when the address is not known. Preferably, a power line communication system like an X10 communications system or a CEBus communications system is used to transmit the reset signal over the power conductors.

BRIEF DESCRIPTION OF THE DRAWING

A full understanding of the invention can be gained from the following description of the preferred embodiments when read in conjunction with the accompanying drawing which is a schematic diagram of an electric power distribution system incorporating the invention.

DESCRIPTION OF THE PREFERRED EMBODIMENTS

Referring to the drawing, the invention is described as applied to an electric power distribution system 1 which includes a network of power conductors 3 including line conductors 5 and neutral conductors 7 arranged to form a plurality of branch circuits 9 all connected to a main circuit 11. Each of the branch circuits 9a–9n includes a remotely resettable miniature circuit breaker 13a–13n connected in the branch conductors 5a–5n and 7a–7n. The circuit breakers 13a–13n are all mounted within a load center 15 which is typically mounted in a remote location such as, in the case of a residence, in the basement or garage.

Each of the circuit breakers 13 includes a set of separable contacts 17 connected in the line conductor 5. An operator 19 for the separable contacts 17 includes a mechanism 21 having a handle 23 through which the separable contacts may be manually opened and closed at the circuit breaker. The circuit breaker 13 also includes a trip unit 25 which can automatically actuate the mechanism 21 to open the separable contacts 17 in response to certain current conditions in the branch circuit 9. This trip unit 25 includes a conventional thermal-magnetic trip device 27. As is well known, the thermal-magnetic trip device 27 includes a bimetal 29 connected in the line conductor 5. The bimetal 29 bends in response to persistent overcurrent conditions to actuate the mechanism 21 and open the contacts 17. The thermal-magnetic trip device 27 also includes an armature 31 which responds to very large overcurrents such as caused by short circuits to provide an instantaneous trip function through actuation of the mechanism 21.

Preferably, but not essentially, the circuit breakers 13 also include an electronic trip unit 33. The electronic trip unit 33 preferably provides both ground fault protection and arc fault protection. In the exemplary electronic trip unit 33, ground fault protection is provided by the well known dormant oscillator ground fault detector which utilizes a pair of sensor coils 35 and 37 inductively coupled to the conductors 5 and 7 of the associated branch circuit 9. Such a ground fault detector, generates a ground fault trip signal in response to detection of leakage of current to ground from either the line conductor 5 or the neutral conductor 7.

The electronic trip unit 33 alternatively, or preferably additionally, includes an arc fault detector. Various types of arc fault detectors are available, and the exemplary arc fault detector is of the type described in U.S. Pat. No. 5,691,869 which detects the step change in current caused by the striking of an arc in the branch circuit and generates a trip signal as a function of the amplitude and frequency of occurrence of the arcs. Arcing currents are detected by monitoring the voltage drop across the bimetal 29 through the leads 39.

The trip signal generated by the electronic trip unit 33, whether in response to a ground fault or an arcing fault, turns on a switch such as the silicon controlled rectifier (SCR) 41 to energize a trip solenoid 43 connected between the line conductor 5 and the neutral conductor 7 of the branch circuit 9. A resistor 45 limits the current drawn by the trip solenoid 43. Energization of the trip solenoid 43 actuates the mechanism 21 to open the contacts 17.

The operator 19 also includes a recloser 47 which is connected across the branch circuit 9 upstream of the separable contacts 17. The recloser 47 includes a recloser actuator in the form of a close solenoid 49 which recloses the separable contacts 17.

The recloser 47 is not only energized through the power conductors 5 and 7, but is also controlled by carrier signals transmitted over the network power conductors 3. In the exemplary embodiment of the invention, an X10 communications system 51 is used to generate the carrier signal remotely from the circuit breaker 13. This X10 communications system 51 includes a remote master unit 53. This remote master unit 53 can be permanently attached to a branch circuit; however, since it transmits the carrier signal over the power conductors it cannot reset a tripped circuit breaker in the branch circuit in which it is connected as the open separable contacts isolate that branch circuit from the recloser. Therefore, it is preferred that the remote unit 53 be selectively connectable to the branch circuits 9 so that an unaffected branch circuit, e.g., 9n, can be utilized to transmit the carrier signal to a slave unit 55 in the recloser 47 to reset the tripped circuit breaker. Conveniently, the remote master unit 53 can be provided with a conventional electrical plug 57 which can be plugged into a receptacle 59, e.g., 59n, in the unaffected branch circuit, e.g., 9n. Thus, when a circuit breaker, such as 13a, in the load center 15 trips, the master unit 53 can be plugged into a receptacle, such as 57n, in a branch circuit 9n which remains energized at a convenient location within the residence remote from the load center 15 to generate a reclose signal which is transmitted over the network of power conductors 3 to the recloser 47 of the tripped circuit breaker.

In the exemplary X10 communications system 51, the recloser 47 in each of the circuit breakers 13 is assigned a unique address. The master unit 53 can address a reclose signal to only a specified circuit breaker 13, or it can send a global reset signal to which all of the reclosers 47 will respond. The latter is useful when the address of the tripped circuit breaker is not known, or it is desirable to restore power to the affected branch quickly without taking time to determine the address. The master unit 53 has an addressing scheme consisting of a four-bit "house code" and a four-bit "device code", both of which have 16 states. Thus, the circuit breakers are organized into groups of 16 addressed by a common "house code" with the individual circuit breakers in the group addressed by the "device code".

Other types of carrier line communication systems such as the CEBus system can be utilized to remotely control the circuit breakers 13 using the power conductors of the distribution system.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of invention which is to be given the full breadth of the claims appended and any and all equivalents thereof.

What is claimed is:

1. An electric power distribution system comprising:
    a network of power conductors forming a plurality of branch circuits connected to a main circuit;
    at least one remotely reclosable circuit breaker comprising:
        a set of separable contacts connected in power conductors of one of said branch circuits adjacent to said main circuit; and
        operating means comprising trip means opening said separable contacts to disconnect said one branch circuit downstream of said separable contacts from said main circuit, and reclose means connected for energization to said power conductors upstream of said separable contacts and responsive to a remote reclose signal to reclose said separable contacts; and
    at least one other circuit breaker connected in at least one other branch circuit; and
    remote means connected to said network of power conductors through said at least one other branch circuit downstream of said at least one other circuit breaker for transmitting said remote reclose signal to said reclose means over said network of power conductors through said at least one other circuit breaker.

2. The system of claim 1 wherein said at least one other branch circuit includes a receptacle downstream of said at least one other circuit breaker and wherein said remote means plugs into said receptacle.

3. The system of claim 1 wherein said remote means comprises X10 communications means.

4. The system of claim 1 wherein said remote means comprises CEBus communications means.

5. The system of claim 1 wherein said at least one other circuit breaker comprises remotely reclosable circuit breakers in a number of said plurality of said branch circuits adjacent said main circuit, and wherein said remote means is connected in a selected branch circuit downstream of the remotely reclosable circuit breaker in the selected branch circuit.

6. The system of claim 1 wherein said at least one other circuit breaker comprises remotely reclosable circuit breakers in a number of said plurality of said branch circuits adjacent said main circuit and wherein said remote means is selectively connectable in any of said plurality of said branch circuits.

7. The system of claim 6 wherein said plurality of said branch circuits include receptacles downstream of the remotely reclosable circuit breakers and wherein said remote means has a plug insertable in any of said receptacles.

8. The system of claim 6 wherein said reclose means of said remotely recloseable circuit breakers comprises a reclose actuator and addressable communication means having an assigned address and responsive to a remote reclose signal containing the assigned address to actuate said reclose actuator, said remote means transmitting said reclose signal with the assigned address of a selected remotely recloseable circuit breaker.

9. The system of claim 8 wherein said addressable communication means is also responsive to a reclose signal with a global address, and said remote means selectively transmits said reclose signal with said global address.

10. The system of claim 9 wherein said branch circuits include receptacles and said remote means includes a plug insertable in a receptacle in a selected branch circuit.

11. The system of claim 10 wherein all of said remotely recloseable circuit breakers are housed in a load center and wherein said receptacles are located in said priority of said branch circuits remote from said load center.

12. The system of claim 5, wherein said trip means of said remotely recloseable circuit breakers include thermal-magnetic trip means and electronic trip means.

13. The system of claim 12 wherein said electronic trip means comprise at least one of an arc fault detector and a ground fault detector.

* * * * *